US011120005B2

(12) United States Patent
Cham et al.

(10) Patent No.: US 11,120,005 B2
(45) Date of Patent: Sep. 14, 2021

(54) RELIABLE WORKFLOW SYSTEM PROVENANCE TRACKING AT RUNTIME

(71) Applicant: International Business Machines Corporation, Armonk, NY (US)

(72) Inventors: Linda C. Cham, Hopewell Junction, NY (US); Frank N. Lee, Sunset Hills, MO (US); Chin Ngai Sze, Austin, TX (US); Qingda Wang, Richmond Hill (CA); Yi-Ling J. Wong, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 15/880,954

(22) Filed: Jan. 26, 2018

(65) Prior Publication Data
US 2019/0236175 A1    Aug. 1, 2019

(51) Int. Cl.
*G06F 16/23* (2019.01)
*G06F 11/30* (2006.01)
*G06F 11/34* (2006.01)

(52) U.S. Cl.
CPC ...... *G06F 16/2365* (2019.01); *G06F 11/3024* (2013.01); *G06F 11/3466* (2013.01)

(58) Field of Classification Search
CPC ............ G06F 16/2365; G06F 11/3024; G06F 11/3466; G06F 11/3476; G06F 11/3006
See application file for complete search history.

(56) References Cited

U.S. PATENT DOCUMENTS

| 5,956,734 | A  | * | 9/1999 | Schmuck ............ G06F 16/1858 |
| 7,043,488 | B1 | * | 5/2006 | Baer ....................... G06F 16/41 |
| 9,354,922 | B2 |   | 5/2016 | Lee |
| 9,696,971 | B1 | * | 7/2017 | Wierda ..................... G06F 8/41 |
| 10,585,656 | B1 | * | 3/2020 | Das ....................... G06Q 10/103 |
| 2007/0157088 | A1 | * | 7/2007 | Lewis-Bowen ....... G06F 3/0482 715/700 |

(Continued)

OTHER PUBLICATIONS

Brietenbucher et al. Published by ACM A situation-aware workflow modelling extension (Year: 2011).*

(Continued)

*Primary Examiner* — Mark D Featherstone
*Assistant Examiner* — Kweku William Halm
(74) *Attorney, Agent, or Firm* — David K. Mattheis; Maeve M Carpenter

(57) ABSTRACT

A method, computer program product, and system for providing provenance tracking in a workflow system. The computer-implemented process provides for one or more processors to receive a workflow definition input. One or more processors perform workflow job commands, in response to receiving a workflow definition, and a workflow instance request. One or more processors access an input file associated with the workflow instance. One or more processors generate, at run-time, provenance metadata. One or more processors generate, at run-time, a global file identification (ID) associated with an output file. One or more processors link the global file ID and the provenance metadata to the output file of the workflow instance, and one or more processors store the output file, which includes the global file ID and the provenance metadata, both linked to the output file.

20 Claims, 3 Drawing Sheets

(56) References Cited

U.S. PATENT DOCUMENTS

| | | |
|---|---|---|
| 2008/0040181 A1 | 2/2008 | Freire et al. |
| 2009/0049422 A1* | 2/2009 | Hage .................. G06F 8/34 |
| | | 717/104 |
| 2010/0070463 A1 | 3/2010 | Zhao et al. |
| 2010/0114629 A1 | 5/2010 | Adler et al. |
| 2017/0277524 A1* | 9/2017 | Bhat .................. G06F 8/63 |
| 2019/0087238 A1* | 3/2019 | Pu .................... G06Q 10/00 |

OTHER PUBLICATIONS

"Open Source Data Management Software", iRODs, Copyright © iRODS Consortium 2017, 7 pages, <https://irods.org/>.

* cited by examiner

RELIABLE WORKFLOW SYSTEM PROVENANCE TRACKING AT RUNTIME

FIELD OF THE INVENTION

The present invention relates generally to the field of traceability of workflow results, and more particularly to automatic recording traceability of provenance data of a workflow instance.

BACKGROUND OF THE INVENTION

A fundamental and well-recognized issue in workload management systems, especially workflow software systems, is provenance tracking. Workflow software is used to create, schedule, execute, and monitor a group of jobs with interdependencies, processing a set of input data and generating a set of output data, to achieve certain objectives, or goals. Provenance data documents and provides a historical record of the data and its origins, the workflow definition, and enables repetition of output data derivation.

Data analysis in many industries often involves a number of processing steps, forming a workflow. Provenance tracking of workflow output is necessary for verification of data quality, and trust value. The provenance of workflow instance results includes information regarding the process and data used to generate a final output data set, often referred to as an output file. Provenance information provides important documentation that confirms the data origin and derivation process.

With exponential data growth across industries, especially in life science and health care, such as genomic data and clinical data, provenance tracking is crucial for demonstrating reproducibility of results. Provenance information also provides auditing trail and data traceability of workflow operations. In workload management systems for digital data processing, provenance tracking encounters limitations of loss of traceability with the corresponding output file, and requirements of manual input for provenance data discovery.

SUMMARY

Embodiments of the present invention disclose a method, computer program product, and system for providing provenance tracking in a workflow system. The computer-implemented process provides for one or more processors to receive a workflow definition input. One or more processors perform workflow job commands, in response to receiving a workflow definition, and a workflow instance request. One or more processors access an input file associated with the workflow instance. One or more processors generate, at run-time, provenance metadata. One or more processors generate, at run-time, a global file identification (ID) associated with an output file. One or more processors link the global file ID and the provenance metadata to the output file of the workflow instance, and one or more processors store the output file, which includes the global file ID and the provenance metadata, both linked to the output file.

DETAILED DESCRIPTION

Figure 1:
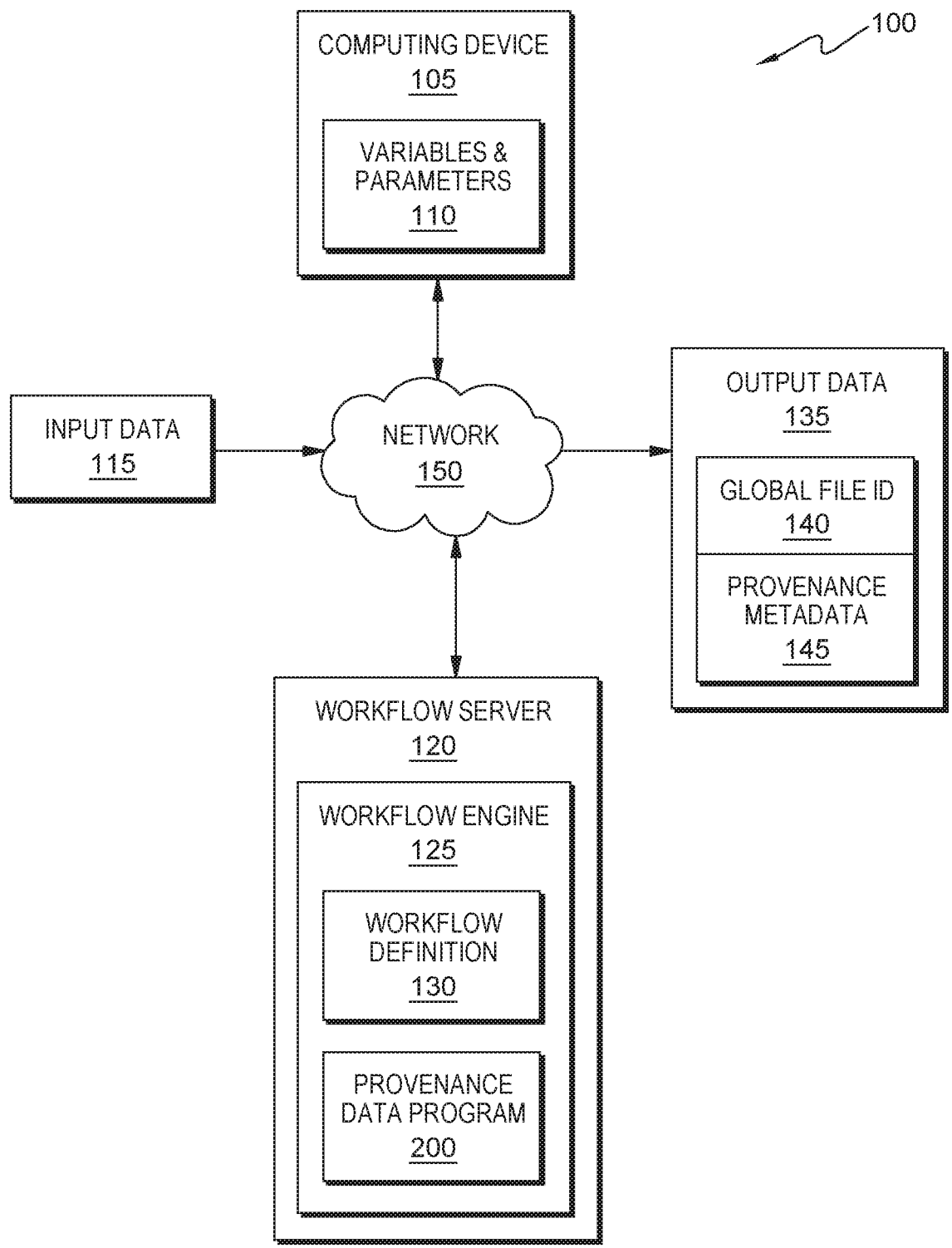
FIG. 1 is a functional block diagram illustrating a distributed workflow processing environment, in accordance with an embodiment of the present invention.

Embodiments of the present invention recognize that collection and tracking of provenance data is challenging and often manually-based, and incomplete, for computing services in general, and scientific workflows in particular. Provenance often includes tracking origins of data resulting from dependencies and interdependencies within workflow instances generating multiple intermediate and final data products. Recording of provenance information enables answering of basic questions, such as the source of input data, the workflow operations performed on data, and whether multiple data products produced from the same raw input. Embodiments of the present invention recognize that generation of provenance information is time-consuming, typically dependent on manual activity, and error-prone.

The provenance of the results of a workflow instance includes information regarding the process and data used to generate a final output data set, often referred to as an output file. Embodiments of the present invention automatically generate and collect provenance information as metadata of a workflow instance, and link the provenance metadata to the output file of the workflow instance. In some embodiments, the provenance metadata is included as an extended attribute of the output file. Some embodiments of the present invention generate a unique global file identification (ID) and link the global file ID to the output file of a workflow instance. In some embodiments, the global file ID is included as an extended attachment of the output file of the workflow instance.

Embodiments of the present invention provide a method, computer program product, and computer system for provenance tracking in a workflow system. In some embodiments, a workflow definition is received as input which, in some embodiments, is configured by a workflow administrator user during configuration of the workflow definition. In other embodiments, the workflow definition may be previously configured, and retrieved from a library or repository. In some embodiments, a workflow instance performs workflow job commands in response to receiving a workflow instance request. In some embodiments, the workflow instance accesses an input file associated with the workflow instance, providing values to name-value pairings of variables as per the workflow definition. In some embodiments, the variables defined in the workflow definition include parametric and environmental variables, as well as object variables, and the workflow definition includes workflow instance naming (identification), version, input data sources, and job command operations of a workflow instance.

In some embodiments of the present invention, job command instructions within the workflow instance generate the provenance metadata of name-value pairings at run-time. In some embodiments, the workflow instance generates a global file ID, and links the global file ID to output file. The global file ID can be queried directly from the file and never changes once set. In some embodiments, the global file ID is stored as an extended attribute of the file. Extended attributes are supported by many file systems and are preserved when the file is moved in the file system. Additionally, the workflow instance also links the provenance metadata to the output file of the workflow instance. The output file, including linkage to the provenance metadata and the global file ID, is stored in a storage structure accessible to the workflow system. In some embodiments, including the global file ID and provenance metadata as extended attributes of the output data file results in generation of a unique data storage structure.

Container technologies can be used to ensure job execution environment and operating system are retained. The method described herein fully supports use of container technologies and platforms. The container image identification (ID), and any other information for running jobs within the containers can be provided as input parameters to the workflow, and the workflow system will record the information automatically in the provenance data. The provenance information can be stored in various performant storage media, such as a relational, or a NoSQL database.

Embodiments of the present invention solve provenance issues of: manual activity to collect provenance information, incomplete data collection, error generation, and inadequate traceability of provenance data due to reorganization of storage structures. In some embodiments of the present invention, the workflow instance generates and collects provenance metadata automatically, and links the provenance metadata to the output file of the workflow instance. Job commands of the workflow instance generate name-value pair sets for the variables included in the workflow definition, at run time. A global file ID uniquely identifies the output file, which enables successful location of the linked provenance metadata, regardless of storage reorganization.

In some embodiments, the linkage of the output file of the workflow instance and the provenance metadata of the workflow instance is accomplished by including the global file ID and the provenance metadata as extended attributes of the output file, insuring discovery and protection of the data necessary for reproducing output file results. The combination of the global file ID and the provenance metadata of a workflow instance, included as extended attributes of the output file for the workflow instance, generates a unique data structure and eliminates location issues of output data and provenance metadata. Additionally, repetition of a workflow instance is simplified. A particular output data file is selected and a request to reproduce the output data is made. The workflow system will retrieve all provenance information from the metadata of the extended attributes of the output data file, and repeat the running of the workflow instance using the same workflow definition of the same version with the same parameters.

In one embodiment of the present invention, a simple command is provided (e.g., &repeatflow <datafile_name>8), so that the workflow system can extract all necessary information from the provenance metadata associated with the specified output data file, then repeat running of the workflow instance to reproduce the output data. The workflow may further provide enhancement of the command to repeat the workflow with variations. For example, a command variation may enable repeating the workflow with one different parameter value than originally used but keeping all other parameters and inputs the same: "&repeatflow) p paramname=paramvalue <datafile_name>8" where &paramname8 is the changed parameter.

The present invention will now be described in detail with reference to the Figures. FIG. 1 is a functional block diagram illustrating a distributed workflow processing environment, generally designated 100, in accordance with an embodiment of the present invention. Distributed workflow processing environment 100 includes computing device 105, workflow definition input 110, input data file 115, workflow server 120, and output data file 135, all interconnected via network 150. Workflow server 120 is depicted as including workflow engine 125, which further includes workflow definition 130, and provenance data program 200. Output data 135 is depicted as including global file ID 140 and provenance metadata 145.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between computing device 105, workflow server 120, a source of input data 115, and a destination location for output data 135, in accordance with embodiments of the present invention.

Computing device 105 provides computing and operational support for user input of components and instructions comprising workflow definition 130. Computing device 105 includes a user interface (not shown) enabling a workflow administrator user to create workflow definition 130 and transmit the workflow definition 130 to workflow engine 125, included within workflow server 120. In some embodiments of the present invention, computing device 105 can be a laptop computer, a tablet computer, a netbook computer, a personal computer (PC), a desktop computer, a personal digital assistant (PDA), a smart phone, or any programmable electronic device capable of performing programmable instructions supporting creation of workflow definition 130, and transmission of workflow definition 130 to workflow engine 125, included in workflow server 120, within distributed workflow processing environment 100 via network 150. In another embodiment, computing device 105 represents a computing system utilizing clustered computers and components (e.g., database server computers, application server computers, etc.) that act as a single pool of seamless resources when accessed within distributed workflow processing environment 100. Computing device 105 may include internal and external hardware components, as depicted and described in further detail with respect to FIG. 3.

Workflow definition input 110 has a well-defined list of required input parameters, which serves as the public interface of the workflow definition. In some embodiments of the present invention, the input parameters are specified as input variables with naturally meaningful names. Workflow definition input 110 includes identification of the workflow, specific version of the workflow, a set of parameter values provided as variable name-value pairs, used in the execution of workflow runs (also referred to as workflow instances), and a set of input data (input files). Workflow definition input 110 has well defined requirements for input data and output data including the number and type of data files, and the actual input and output files are resolved and known to the workflow system on initiation of a workflow instance. In some embodiments, intermediate or temporary files are generated internal to the workflow, and are not specified within workflow definition input 110. In some embodiments of the present invention, a workflow administrator/designer-user, operating a computing device such as computing device 105, may generate workflow definition input 110, and list workflow definition input 110 as a specific version, for selection. In other embodiments, a user may select a pre-defined version of workflow definition input 110. Workflow definition input 110 is received by workflow engine 125, depicted in FIG. 1 as operating on workflow server 120.

Input data file 115 represents one or more sources of input data specified for a workflow instance. The number and type of input data may be included in workflow definition input 110, however, the specific input file name and file path are included in the initiation of a particular workflow instance. Input data file 115 may be specified for the workflow instance, or may be specified for one or more jobs within a workflow instance. A workflow is a group of jobs or steps with interdependencies to achieve a certain business objective.

Output data file 135 represents one or more data output destinations, typically as an output file stored at locations within a storage structure of the workflow system, or accessible to the workflow system. Output data file 135 is specified for a workflow instance, and may include parameters specified in workflow definition input 110 defining the output file name and file location path. Identification and characteristics of output data file 135 may be specified for the workflow instance, or may be specified for one or more jobs within a workflow instance. In some embodiments of the present invention, global file ID 140 and provenance metadata 145 (discussed in detail below) are specified as included in extended attributes of output data file 135. In other embodiments, provenance metadata 145 may be saved in history logs in specified directories of the workflow system, and associated with global file ID 140 for traceability.

Global file ID 140 is a unique identification of an output file of a completed workflow instance. Global file ID 140 is linked to output data file 135 as well as provenance metadata 145, which corresponds to the data of output data file 135. In some embodiments of the present invention, global file ID 140 is included in output data file 135 as an extended attribute, thus enabling the output file to be located by search functions, regardless of subsequent reorganization of storage structures, such as database objects, log files, etc. Global file ID 140 enables reliable synchronization of the data of output data file 135, and provenance metadata 145. Global file ID 140 also provides reliable search capability to locate output data file 135, resolving existing issues of output file location changes due to storage reorganization.

Provenance metadata 145 includes provenance information associated with a workflow instance resulting in a particular output file. Provenance metadata 145 is depicted as associated with output data file 135, along with global file ID 140. In some embodiments of the present invention, provenance metadata 145 is included in output data file 135 as a set of extended attributes. In other embodiments, provenance metadata 145 may be saved in a history log, and include an instance of global file ID 140, linking provenance metadata 145 to output data file 135. By including global file ID 140 and provenance metadata 145 as extended attributes of output data file 135, the provenance information and output data remain linked and are always in sync, and including global file ID 140 as an extended attribute of output data file 135 insures that the output data and provenance information can be reliably located (by search methods), regardless of changes and reorganization of storage structures.

In some embodiments, provenance metadata 145 includes, but is not limited to: workflow name, workflow definition name (or identification (ID)), workflow definition version, input files, parameters and variables. In some embodiments of the present invention, additional provenance data may be captured for jobs comprising the workflow, such as: job name, job ID, job start/end time, flow ID, and environment variables, among others.

Workflow server 120 provides computing and operational support of workflow engine 125, which is depicted as including device training program 200. In some embodiments of the present invention, workflow server 120 is a host for performing workflow instances that are based on workflow definition 130, and operation of provenance data program 200. In other embodiments, workflow server 110 is remotely connected to workflow engine 125, workflow definition 130, and provenance data program 200 (not shown as remote connection), which may be hosted on other devices, but are connected via network 150.

In some embodiments of the present invention, workflow server 120 can be a management server, a web server, a mobile computing device, or any other electronic device or computing system capable of receiving, sending, and processing data, and supporting the operational functions workflow engine 125, workflow definition 130, and provenance data program 200. In other embodiments, workflow server 120 can represent a server computing system utilizing multiple computers as a server system, such as in a cloud computing environment. In still other embodiments, workflow server 120 can be a laptop computer, a tablet computer, a netbook computer, a personal computer (PC), a desktop computer, a personal digital assistant (PDA), a smart phone, or any programmable electronic device capable of performing programmable instructions supporting workflow engine 125, workflow definition 130, and operation of provenance data program 200, within distributed workflow processing environment 100 via network 150. In another embodiment, workflow server 120 represents a computing system utilizing clustered computers and components (e.g., database server computers, application server computers, etc.) that act as a single pool of seamless resources when accessed within distributed workflow processing environment 100. Workflow server 120 may include internal and external hardware components, as depicted and described in further detail with respect to FIG. 3.

Workflow engine 125 performs workflow instance operations. In some embodiments of the present invention, workflow engine 125 receives workflow definition 130 from workflow definition input selected by a user of computing device 105, as well as input data file 115 from a path defined in workflow definition 130, or commands within the workflow instance. Workflow engine 125 receives a request to perform a workflow instance of workflow definition 130, and performs the operations of one or more jobs of the workflow instance. Workflow engine generates output data file 135 as a result of completing the requested workflow instance, and works in conjunction with provenance data program 200 to include association and linkage of global file ID 140 and provenance metadata 145 with output data file 135.

Workflow definition 130 is received from workflow definition input 110 selected as a previously generated workflow definition. Workflow definition 130 includes workflow information such as: identification (ID) of the workflow, specific version of the workflow, commands to configure and perform operations on data, a set of parameters, used in the execution of workflow runs (also referred to as workflow instances), and a set of input data (input files). Workflow definition input 110 has well defined requirements for input data and output data including the number and type of data files, and the actual input and output files, as well as values of parameters, are resolved and known to the workflow system on initiation of a workflow instance. Parameters and values are ultimately captured as provenance metadata for a particular workflow instance. Workflow definition 130 also includes provenance information to collect, such as: workflow name, workflow definition name (or identification (ID)), workflow definition version, input files, parameters and variables. In some embodiments of the present invention, additional provenance data may be captured for jobs comprising the workflow, such as: job name, job ID, job start/end time, job execution command, flow ID, and environment variables, among others.

Provenance data program 200 captures and compiles provenance metadata for a workflow instance and generates global file ID 140 for output data file 135. Provenance data program 200 links output data file 135 and provenance metadata 145 by use of global file ID 140, and in some embodiments of the present invention, includes the global file ID 140 and provenance metadata 145 as extended attributes of output data file 135, for a particular workflow instance. In response to receiving a workflow instance request, based on a received workflow definition, provenance data program 200 captures and compiles provenance information as metadata, based on the configuration and commands within the workflow definition. Provenance data program 200 generates a global file ID for the output file of the workflow instance, and links the global file ID and the provenance information to the workflow instance output file.

For example, having received a request for a workflow instance, based on workflow definition 130 received by workflow engine, hosted on workflow server 120, from workflow definition input 110 transmitted from computing device 105, provenance data program 200 determines the provenance information to capture, by scanning workflow definition 130 of the workflow instance. Workflow engine 130 performs the commands and job operations of the workflow instance and generates output data file 135. Provenance data program 200 generates, at run-time, provenance metadata, providing variable names for name-value pairings. Provenance data program 200 generates global file ID 140, and uniquely associates global file ID 140 with output data file 135. Provenance data program 200 links provenance metadata 145 with global file ID 140, and in conjunction with workflow engine 130, stores output data file 135 and provenance metadata 145, both linked to global file ID 140. In some embodiments of the present invention, provenance data program 200 includes global file ID 140 and provenance metadata 145 in output data file 135 as extended attributes of output data file 135. In other embodiments in which provenance metadata 145 may be stored in a history log, separate from output data file 140, with global file ID 140 included as a search-enabled attribute of both output data file 135 and provenance metadata 145.

Figure 2:
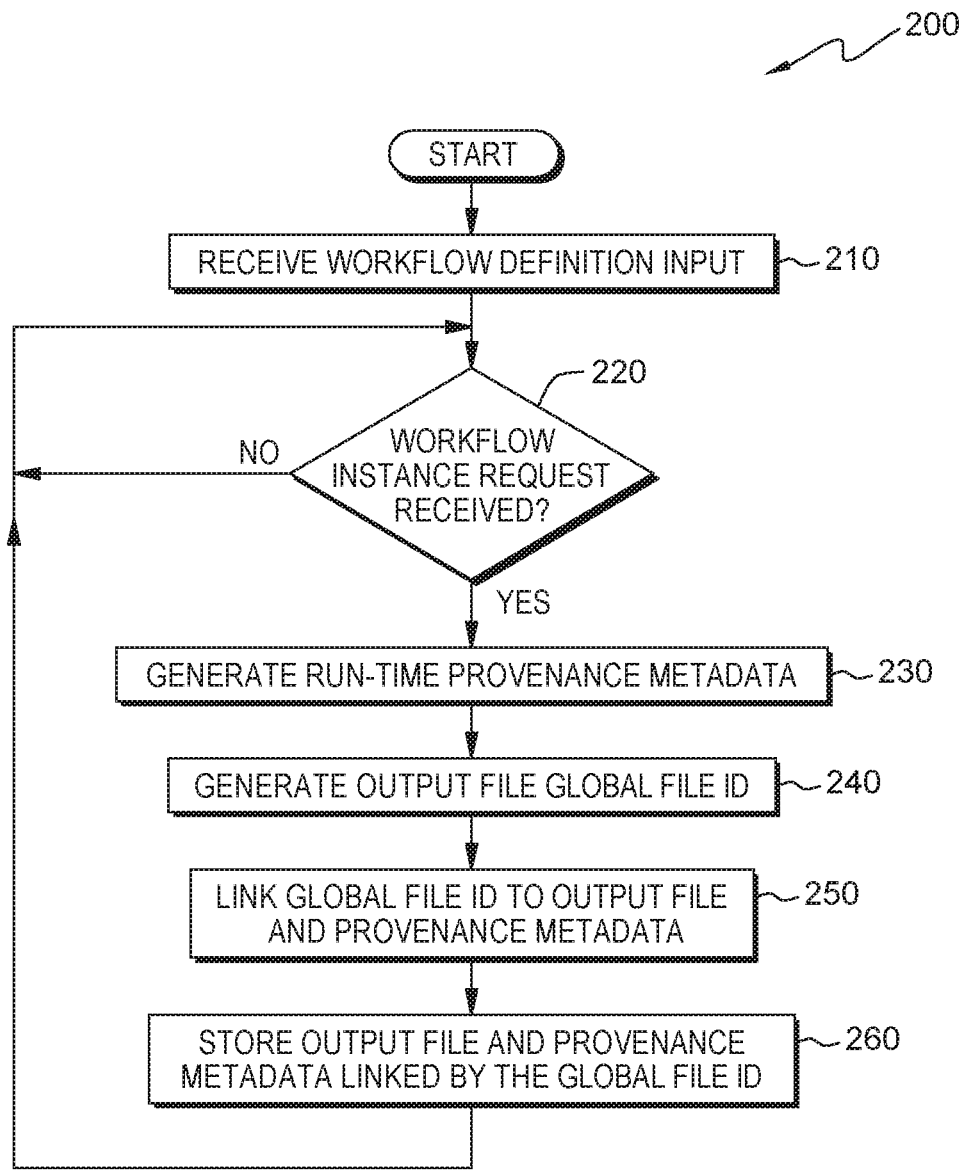
FIG. 2 illustrates operational steps of a provenance data program, operating within a workflow server within the distributed data processing environment of FIG. 1, in accordance with an embodiment of the present invention.

FIG. 2 illustrates operational steps of provenance data program 200, working in conjunction with workflow engine 125, hosted on workflow server 120 within the distributed workflow processing environment of FIG. 1, in accordance with an embodiment of the present invention. In some embodiments of the present invention, provenance data program 200 receives input of a workflow definition from a workflow system implementing version control of workflow definitions. The workflow definition includes a list of variables used by the jobs within the workflow to run a workflow instance. Provenance data program 200 records the name-value pairs of the variables in the provenance data for a particular workflow instance. The names of the variables will serve as natural keys in the provenance data and facilitate subsequent searches. In some embodiments of the present invention, provenance data program 200 provides capability enabling jobs to add provenance information at run-time. Provenance data program 200 captures full provenance information for a given workflow instance, and links the provenance information (as provenance metadata) to the output file of the workflow instance, by linking the output file and provenance metadata to a global file ID.

Provenance data program 200 receives a workflow definition as input (step 210). Provenance data program 200 determines workflow variables, commands, and parameters for a workflow instance from the content of a workflow definition, received by user input or selection. The workflow definition is generated by a workflow designer or administrator, and is often predetermined and available for selection by user. The workflow definition includes the variables used in performing job commands of the workflow, as well as input file information, such as number of files, file types, and file paths. Workflow definitions include, but are not limited to: a workflow name, workflow definition version, execution user, input variables, environment variables, input data (all input files/paths), variables designated to be set at run-time within an active workflow instance. The complete provenance information enables subsequent reproducibility of the workflow instance, provided that the same execution environment, including application and operating system (versions) are retained or recoverable, or reproducible, the input data has not changed, the workflow is designed to run in a deterministic manner. In some embodiments of the present invention, reproducible environment conditions are met by applying container technologies.

For example, provenance data program 200, working in conjunction with workflow engine 125, receives workflow definition 130 as workflow definition input 110 transmitted from computing device 105, by a selection made by a user.

Provenance data program 200 determines whether a workflow instance request is received (decision step 220). Provenance data program 200 listens for receipt of a request to perform a workflow instance associated with the received workflow definition. A particular workflow instance may have specific input and/or operational parameters. For the case in which provenance data program 200 determines that a workflow instance request has not been received (step 220, "NO" branch), provenance data program 200 continues to listen and monitor for receipt of a workflow instance request, repeating step 220. For the case in which provenance data program 200 confirms that a workflow instance request has been received (step 220, "YES" branch), provenance data program 200 proceeds to generate run-time provenance metadata (step 230).

Provenance metadata compiled by provenance data program 200 may include, but is not limited to: workflow name, workflow definition name (or identification (ID)), workflow definition version, workflow execution user, input variables and name-value pairs, input data (all input files), workflow parameters, and variables set by jobs at run-time within a workflow instance. For example, the workflow definition specifies parameters to be used, such as parameter A and parameter B; however, when a workflow instance is initiated from the workflow definition, values will be provided for these parameters, such as parameter A=100, parameter B=XYZ. The specified parameters and assigned values, parameter A=100 and parameter B=XYZ will be captured as the provenance metadata for the workflow instance. In some embodiments of the present invention, additional provenance data may be captured for jobs comprising the workflow, such as: job name, job ID, job start/end time, and environment variables, among others.

Provenance data program 200 determines the workflow variables for which run-time name-value pairings are generated, based on the variable and command information included in the received workflow definition, and any job commands of the workflow instance. For example, provenance data program 200 interprets command line parameters, extracts metadata information from input files, and verifies application binary version. In some embodiments of the present invention, a system command, such as "&jobsetprov key1=value1, key2=value2", can be included in a job script with the workflow. The job can calculate name-value pairs (sometimes referred to as key-value pairs) based on logic, and assigns values to variables. During job execution, the command is run in the context of the job, sending job context information along with the name-value pairs to the workflow system. The variables are recorded within the context of the running workflow instance (i.e., run-time) and, therefore, become part of the provenance information. For instance, a variable, "Reference" may have a value set from input files at run-time by a command "&jobsetprov Reference=2374", and provenance data program 200 captures "Reference=2374" as a name-value pair as part of provenance metadata.

Provenance data program 200 generates output file global file ID (step 240). For each workflow instance, provenance data program 200 generates a global file ID uniquely associated with the output file of the particular workflow instance. The global file ID identifies the output file of the workflow instance and, when linked to the provenance metadata generated during the processing of the workflow instance, maintains synchronization of the output data and the provenance metadata, even if the files are moved in the underlying structures of the storage system, such as changes in databases, database tables, or storage hosting devices. In some embodiments of the present invention, the synchronization of the output data and provenance metadata, as well as search recovery, are accomplished by including the global file ID uniquely associated with the output file of the particular workflow instance, and the provenance metadata of the particular workflow instance, as extended attributes of the output file.

For example, provenance data program 200, having generated provenance metadata 145 (in some embodiments, at run-time of the workflow instance), along with workflow instance results data in output data file 135, generates global file ID 140, which is unique to the workflow instance, output data file 135 resulting from the workflow instance, and provenance metadata 145. Provenance data program 200 includes global file ID 140 and provenance metadata 145 as extended attributes of output data file 135, for a particular instance of the workflow.

Provenance data program link the global file ID to the output file and provenance metadata of the workflow instance (step 250). In some embodiments of the present invention, provenance data program 200 links the global file ID to the output file and provenance metadata of the workflow instance, by including the global file ID and the provenance metadata in extended attributes of the output file. In other embodiments in which the provenance metadata is stored in history logs, the global file ID is included within both the provenance metadata and the output file of the workflow instance, and is searchable. The global file ID is unique to the workflow instance, and enables a linkage between the output file and the provenance metadata, insuring reproducibility of all workflow conditions, input data, and operational steps, and ultimately, reproducibility of results. The aspect of reproducibility of data processing results is a critical aspect to trust and reliability in scientific, financial, and business fields.

For example, provenance data program 200 includes global file ID 140 as a first extended attribute of output data file 135, and includes provenance metadata 145 as a set if additional extended attributes of output data file 135. Including global file ID 140 and provenance metadata 145 as extended attributes of output data file 135 facilitates searches for particular data sets and insures the synchronization and availability of provenance information (i.e., provenance metadata 145) associated with the results of output data file 135.

Having linked the global file ID of the workflow instance to the output file and provenance metadata, provenance data program 200 stores the output file and provenance file linked by the global file ID (step 260). In some embodiments of the present invention, provenance data program 200 stores the output file in the underlying storage facilities associated with the workflow system, which may be hosted by on a workflow server, or may be accessible to provenance data program via workflow server network connection. The provenance metadata may also be stored in the underlying storage structures, such as a database, file system, storage array, or other storage structure, or accessible via network connection. Provenance data program 200 includes an association with the global file ID in the output file and provenance metadata, enabling search and linkage of output data and provenance information of the complete workflow instance.

For example, in one embodiment of the present invention, provenance data program 200 stores output data file 135 in a database (not shown) hosted on workflow server 120, within distributed workflow processing environment 100. Output data file 135 includes global file ID 140 as a first extended attribute of output data file 135, and includes provenance metadata 145 as a second extended attribute of output data file 135. In this manner, the provenance information for the output data of the workflow instance are bundled and easily linked by global file ID 140. In another embodiment, output data file 135 includes global file ID 140 as an extended file attribute, and provenance metadata is stored with global file ID 140 included within the provenance metadata, or as an extended attribute of the metadata file. Output data file 135 and provenance metadata 145 are linked and searchable by global file ID 140.

Having stored the output file and the provenance metadata of the workflow instance, provenance data program returns to step 220 and listens for receipt of a subsequent workflow instance requests.

Figure 3:
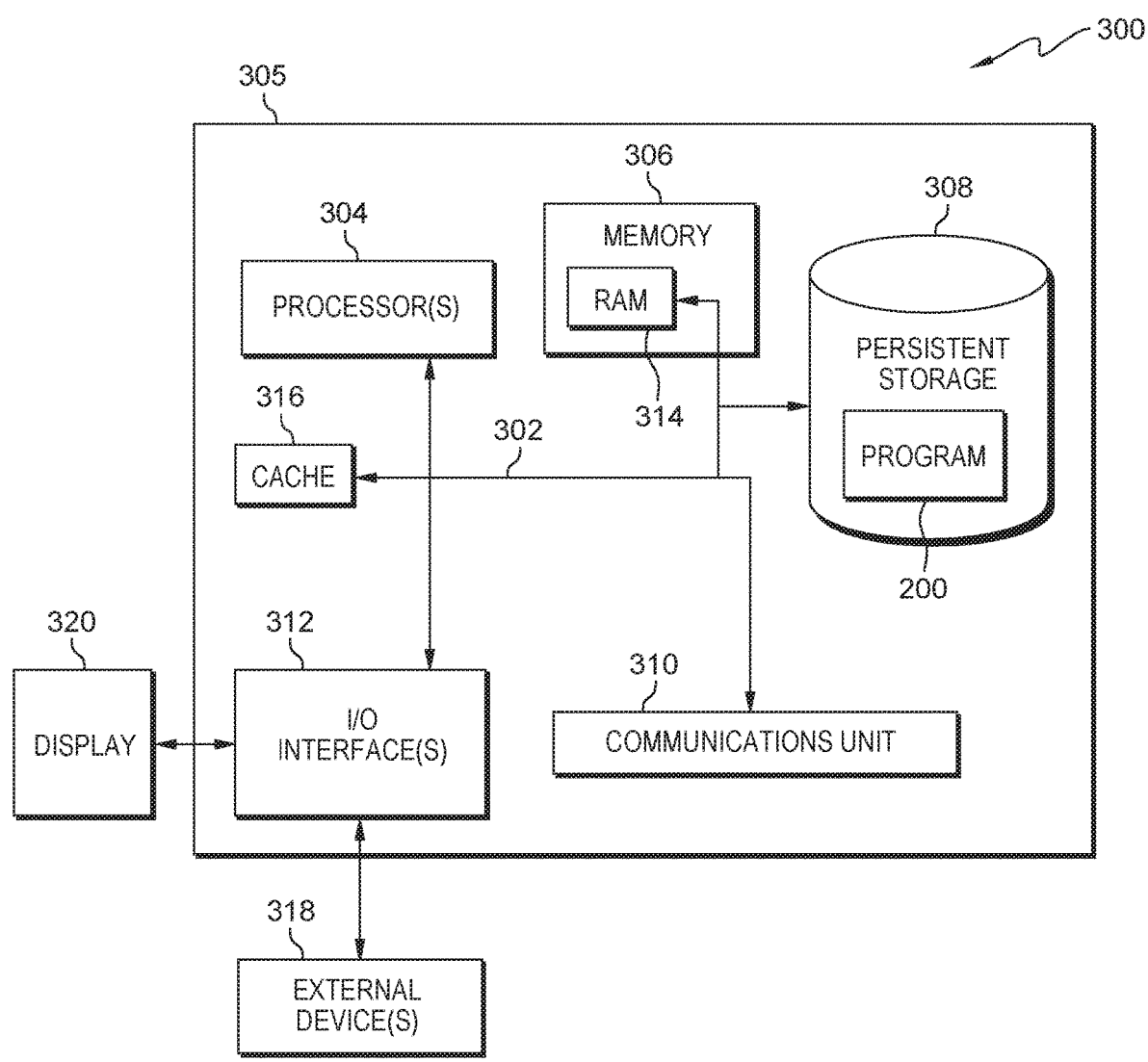
FIG. 3 depicts a block diagram of components of a computing system, such as a server computer or smart device, capable of operationally performing the provenance data program, in accordance with an embodiment of the present invention.

FIG. 3 depicts a block diagram of components of computing system 300, which includes computing device 305. Computing device 305 includes components and functional capability similar to computing device 105, and workflow server 120 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306, cache memory 316, and persistent storage 308 are computer readable storage media. In this embodiment, memory 306 includes random access memory (RAM) 314. In general, memory 306 can include any suitable volatile or non-volatile computer readable storage media.

Provenance data program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of distributed workflow processing environment 100, and devices of environments connected to network 150. In these examples, communications unit 310 includes one or more network interface cards. Communications unit 310 may provide communications through the use of either or both physical and wireless communications links. Provenance data program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., provenance data program 200 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for provenance tracking in a workflow system, the computer-implemented process comprising:
    receiving workflow definition input;
    performing workflow job commands, in response to receiving a workflow definition that includes the workflow job commands and a workflow instance;
    accessing an input file associated with the workflow instance;
    generating, at run-time, provenance metadata associated with the workflow instance, including retention of environment and operating system conditions by use of container technologies;
    generating, at run-time, an output file, and a global file identification (ID) associated with the output file, which is unique to the workflow instance;
    including the global file ID and the provenance metadata with the output file of the workflow instance as extended attributes; and
    storing the output file including the global file ID and the provenance metadata as extended attributes of the output file, wherein the extended attributes enable reproducibility of the workflow instance.

2. The method of claim 1, wherein the workflow definition includes a workflow name, a workflow version, parameters of the workflow, variables of the workflow, job commands performed in the workflow, and input data source for each workflow instance.

3. The method of claim 1, wherein the provenance metadata includes name-value pairs generated from the input file values assigned to workflow variables, based on the workflow definition.

4. The method of claim 1, wherein a variable of a name-value pair of the workflow definition is named at run-time of the workflow instance.

5. The method of claim 1, wherein the global file ID is included with the provenance metadata of the workflow instance, and the provenance metadata is stored in a history log and is searchable, based on the global file ID.

6. A computer program product for provenance tracking in a workflow system, the computer program product comprising:
    one or more computer readable storage media wherein the computer readable storage medium is not a transitory signal per se, and program instructions stored on the one or more computer readable storage media, the program instructions comprising:
    program instructions to receive workflow definition input;
    program instructions to perform workflow job commands, in response to receiving a workflow definition that includes the workflow job commands and a workflow instance;
    program instructions to access an input file associated with the workflow instance;
    program instructions to generate, at run-time, provenance metadata associated with the workflow instance, including retention of environment and operating system conditions by use of container technologies;
    program instructions to generating, at run-time, an output file and a global file identification (ID) associated with the output file, which is unique to the workflow instance;
    program instructions to include the global file ID and the provenance metadata with the output file of the workflow instance as extended attributes; and
    program instructions to store the output file including the global file ID and the provenance metadata as extended attributes of the output file, wherein the extended attributes enable reproducibility of the workflow instance.

7. The computer program product of claim 6, wherein the workflow definition includes a workflow name, a workflow version, parameters of the workflow, variables of the workflow, job commands performed in the workflow, and input data source for each workflow instance.

8. The computer program product of claim 6, wherein the provenance metadata includes name-value pairs generated from the input file values assigned to workflow variables, based on the workflow definition.

9. The computer program product of claim 6, wherein the global file ID is included with the provenance metadata of the workflow instance, and the provenance metadata is stored in a history log and is searchable, based on the global file ID.

10. A computer system for provenance tracking in a workflow system, the computer system comprising:
  one or more computer processors, one or more computer readable storage media, program instructions stored on the computer readable storage media for execution by at least one of the one or more processors, the program instructions comprising:
    program instructions to receive workflow definition input;
    program instructions to perform workflow job commands, in response to receiving a workflow definition that includes the workflow job commands, and a workflow instance;
    program instructions to access an input file associated with the workflow instance;
    program instructions to generate, at run-time, provenance metadata associated with the workflow instance, including retention of environment and operating system conditions by use of container technologies;
    program instructions to generate at run-time, an output file and a global file identification (ID) associated with the output file, which is unique to the workflow instance;
    program instructions to included the global file ID and the provenance metadata with the output file of the workflow instance as extended attributes; and
    program instructions to store the output file including the global file ID and the provenance metadata as extended attributes of the output file, wherein the extended attributes enable reproducibility of the workflow instance.

11. The computer system of claim 10, wherein the provenance metadata includes name-value pairs generated from the input file values assigned to workflow variables, based on the workflow definition.

12. The computer system of claim 10, wherein the global file ID is included with the provenance metadata of the workflow instance, and is searchable, based on the global file ID.

13. The computer system of claim 10, wherein a variable of a name-value pair of the workflow definition is named at run-time of the workflow instance.

14. The method of claim 1, wherein the provenance metadata includes workflow job name, workflow job identification, workflow job start and end time, workflow job execution command, and workflow environment variables.

15. The computer program product of claim 6, wherein the provenance metadata includes workflow job name, workflow job identification, workflow job start and end time, workflow job execution command, and workflow environment variables.

16. The computer system of claim 10, wherein the provenance metadata includes workflow job name, workflow job identification, workflow job start and end time, workflow job execution command, and workflow environment variables.

17. The method of claim 1, further comprising:
  in response to determining that a workflow instance includes a job command to store the provenance metadata separate from the output file, adding the global file ID within the metadata, wherein the global file ID added to the provenance metadata is searchable.

18. The computer program product of claim 6, further comprising:
  in response to determining that a workflow instance includes a job command to store the provenance metadata separate from the output file, program instructions to add the global file ID to the metadata, wherein the global file ID added to the provenance metadata is searchable.

19. The computer system of claim 10, further comprising:
  in response to determining that a workflow instance includes a job command to store the provenance metadata separate from the output file, program instructions to add the global file ID to the metadata, wherein the global file ID added to the provenance metadata is searchable.

20. The method of claim 1, wherein the workflow instance is performed within a container having a container image identification (ID) which is included in the provenance metadata as an extended attribute of the output file along with the global file ID.

* * * * *